June 6, 1933.  W. WALTAMATH  1,912,745
REAMER SHARPENER
Filed Sept. 23, 1931   3 Sheets-Sheet 1
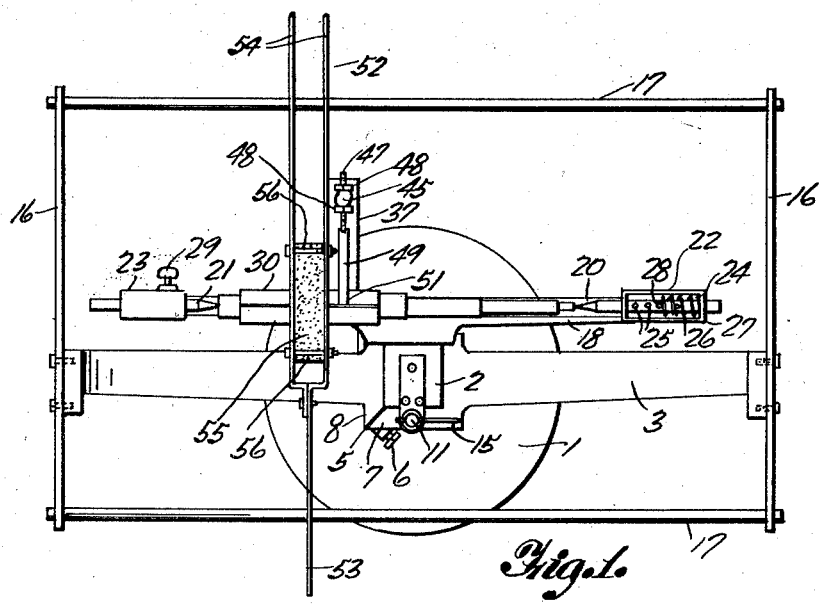
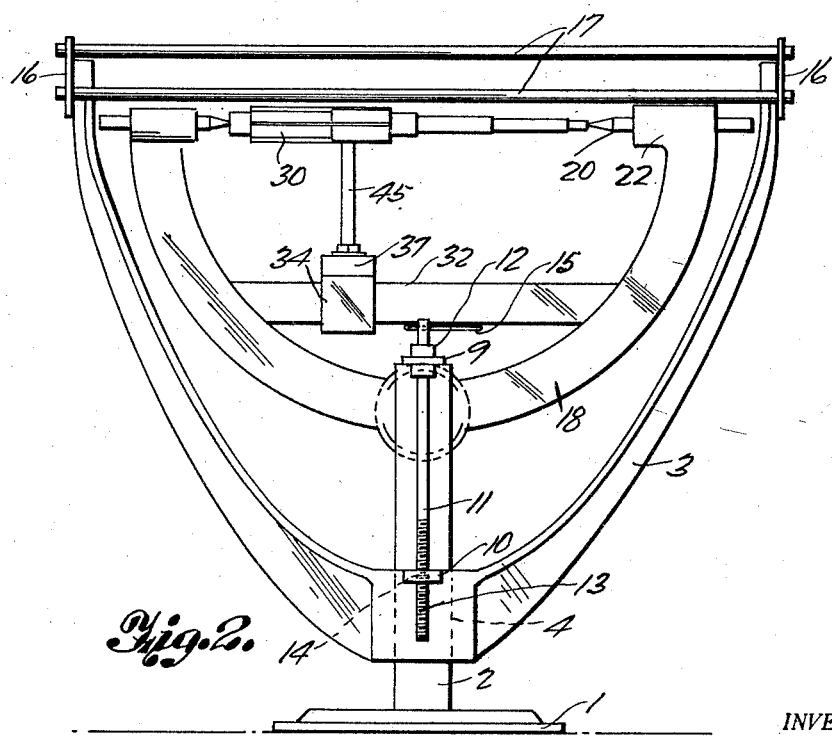
INVENTOR.
William Waltamath
BY Adam E. Fisher
ATTORNEY.

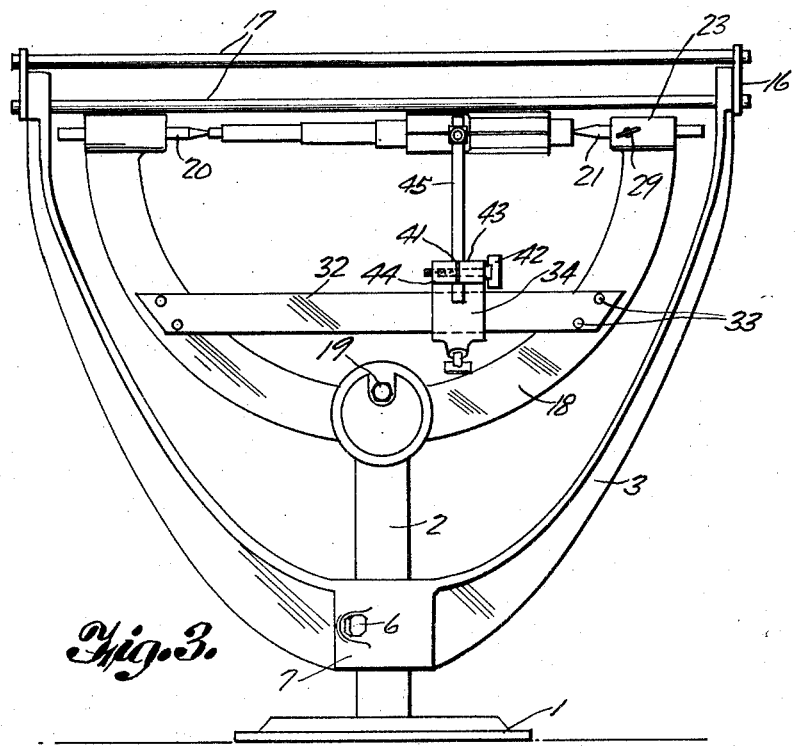
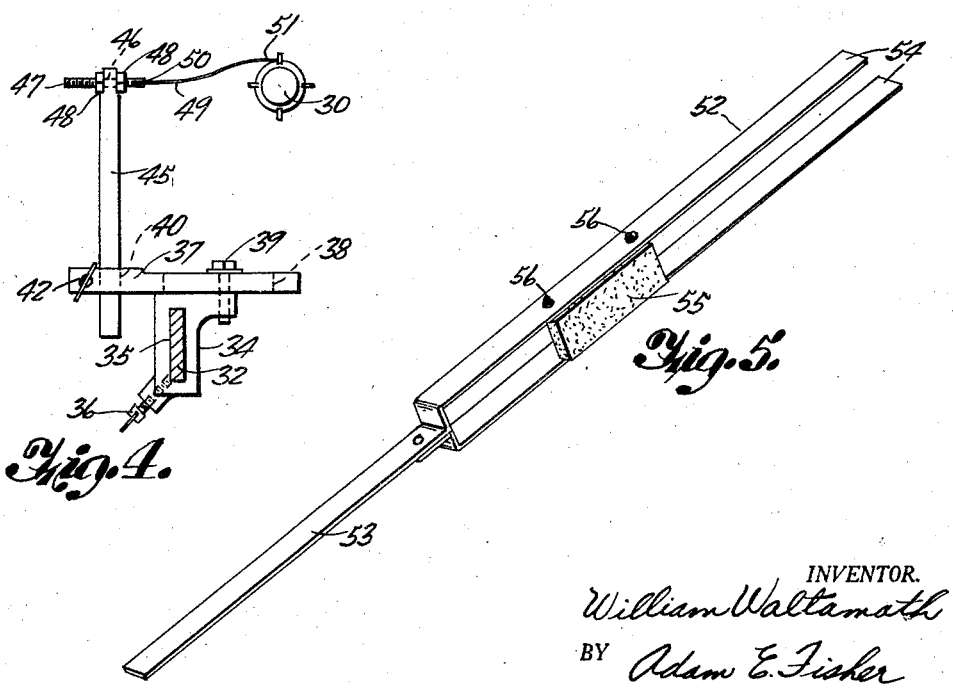

June 6, 1933.  W. WALTAMATH  1,912,745
REAMER SHARPENER
Filed Sept. 23, 1931   3 Sheets-Sheet 3
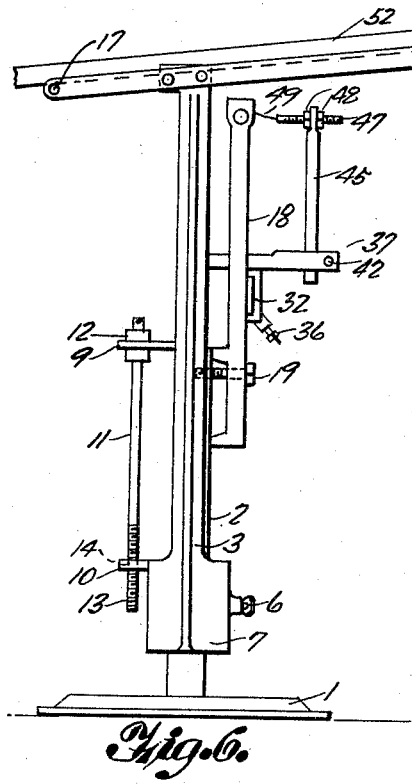
Fig. 6.
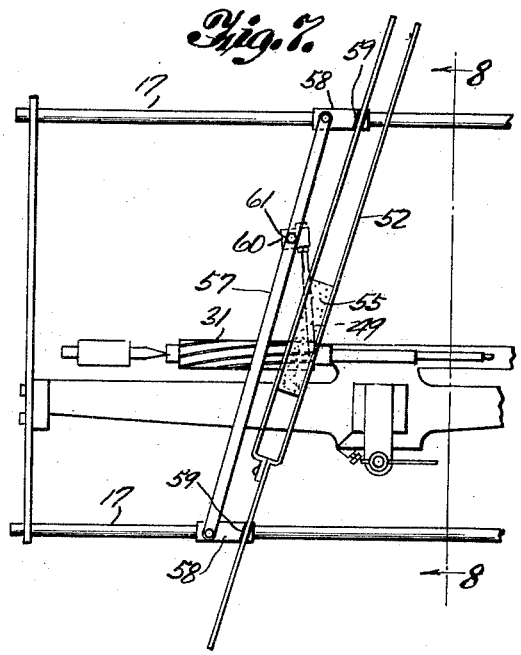
Fig. 7.
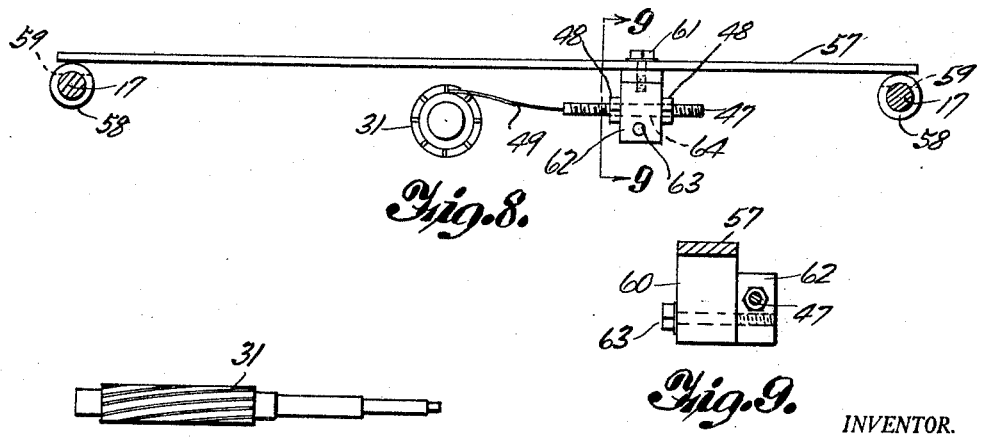
Fig. 8.
Fig. 9.
Fig. 10.
INVENTOR.
William Waltamath
BY Adam E. Fisher
ATTORNEY.

Patented June 6, 1933

1,912,745

UNITED STATES PATENT OFFICE

WILLIAM WALTAMATH, OF ST. LOUIS, MISSOURI

REAMER SHARPENER

Application filed September 23, 1931. Serial No. 564,523.

This invention relates to devices or tools for sharpening reamers, or other cutting tools.

One object of the invention is to provide a reamer sharpener in a relatively simple and compact form, including means for sharpening both straight bladed and spiral bladed reamers.

Another object is to provide a tool of the kind referred to, wherein means are provided for pivotally mounting the reamer to be sharpened in a horizontal position, or any angle off the horizontal plane, cooperatively with a pair of likewise horizontally arranged rests or hone holder bearing arms spaced at either side of the reamer, and adapted to slidably support the ends of the hone holder, to the end that the blades of the reamer may be concentrically and uniformly sharpened from end to end, or to any taper desired from end to end.

Another object is to provide a tool of the kind referred to, the same including a base having a post vertically extended therefrom, a hone holder bearing yoke adjustably mounted at the lower end of the post, a rectangular frame rigidly mounted in substantially horizontal position at the upper ends of the yoke, said frame including laterally spaced rests or bearings for the hone holder constituting part of the tool, a reamer holder yoke pivotally or rotatably mounted upon the upper end of the said post for movement in a plane of or including paralleling a plane passed through or including the axes of the arms of the said hone holder bearing yoke, means at the ends of the reamer holder yoke for rotatably suspending a reamer therebetween, means for releasably locking the reamer against rotation while one of its blades is being sharpened, and a hone mounted in a hone holder with the latter slidably positioned upon the said bearings provided for that purpose.

Another object is to provide in a tool of the kind referred to and wherein is embodied means for rotatably supporting a spiral bladed reamer in position for sharpening, separate means coacting with the spiral blades of the reamer for rotating the reamer to maintain any particular blade being sharpened in uniform contact with the sharpening agent, such as a hone, as the latter is moved from end to end of the blade.

Another object is to provide in a tool of the kind referred to, the combination of a frame including a pair of bearings horizontally arranged and laterally spaced apart, adapted to slidably support a hone carrier or holder and hone mounted therein, and another frame mounted within the first mentioned frame and adapted to support a reamer, the two frames being adapted for both vertical and longitudinal rocking adjustment relative to each other, for the purpose of exactly positioning the reamer to the required action of the hone.

Another object is to adjustably mount reamer supporting means in association with hone supporting means, and blade guiding means, to the end that reamers of any kind may be conveniently sharpened, whether straight or spiral bladed or whether cylindrical or conical or tapered from end to end, and so that the blades may be sharpened on any fixed angle desired across their cutting edges.

With the foregoing and such other objects and advantages in view as may appear from the following specification, attention is now directed to the accompanying drawings as embodying a preferred embodiment of my invention, and wherein Figure 1 is a plan view of the tool as in actual use in the operation of sharpening a straight bladed reamer;

Figures 2 and 3 are side elevations taken at opposite sides of the tool;

Figure 4 is a detail of the slidable reamer lock block and accessories;

Figure 5 is a perspective view of the hone carrier and hone;

Figure 6 is an end view of the assembly shown in Figure 1;

Figure 7 is a plan view of one end of the tool as in use for sharpening a spiral bladed reamer, showing the special accessory for this purpose;

Figure 8 is an enlarged sectional detail on the line 8—8 in Figure 7;

Figure 9 is a sectional detail on the line 9—9 of Figure 8;

Figure 10 is a detail of a spiral bladed reamer.

In carrying out the invention as exemplified in the present drawings, I provide a base 1 upon which is mounted a squared post 2. A hone holder bearing yoke 3 is slidably mounted upon this post, the base of the yoke being pierced with a squared aperture 4 for engaging the post and one wall of the aperture being parted as shown at 5. A set screw 6 is then passed loosely through one margin 7 of the parted wall and into threaded engagement with the opposite margin 8, whereby the yoke may be locked to any desired vertical adjustment upon the post by turning up the said screw to accommodate reamers of various diameters. A lug 9 is extended from the upper end of the post 2 in alignment with a lug 10 extended from the base of the yoke 3. An adjustment bar 11 is loosely passed through the upper lug 9, its head 12 having a bearing upon the same, while the lower end of the bar is threaded, as shown at 13, and thereby placed in threaded engagement with a threaded bore 14 formed in the lug 10. A lever pin 15, passed through the head 12, affords means for easily rotating the screw bar 11, whereby the yoke 3 may be raised or lowered upon the post 2, as desired. When thus properly positioned, the yoke may be locked by turning up the set screw 6, as above pointed out. Cross pieces 16 are fastened at the upper ends of the arms of the yoke 3, and a pair of hone carrier bearing rods 17 are extended in parallel relation between the aligned ends of the cross pieces 16, the elements 16 and 17 thus constituting a rectangular frame supported in substantially horizontal position upon the yoke 3. A reamer holder yoke 18, which is somewhat smaller than the said hone holder bearing yoke, is pivotally mounted upon the upper end of the post 2 by passing a set screw or bolt 19 through the base of the yoke into threaded engagement with the post, as shown. The yoke 18 is thus adapted to rock in a plane paralleling the plane including the axes of the arms of the hone holder bearing yoke. Horizontal aligned centers 20 and 21 are adjustably arranged at the upper ends of the arms of the yoke 18. For this purpose the extremities of the arms are formed into bearings 22—23, within which the centers are journaled.

One of the bearings, as 22, is hollowed out as shown at 24, and the center 20 of this bearing is provided with a series of aligned holes 25. A coil spring 26 is mounted over this center and is braced between the outer wall 27 of this bearing and a pin 28 passed into any one of the said holes 25. Thus the center 20 is resiliently seated and is normally urged inwardly towards its companion center 21. The said center 21 is rendered longitudinally adjustable by means of a set screw 29 passed through the wall of the bearing 23 in threaded engagement therewith, and adapted at its inner end to bear upon and lock the center 21. Thus any reamer, as 30 or 31, may be rotatively positioned between the centers 20—21. A rectangular slide bar 32 is secured at its ends as shown at 33 across the arms of the yoke 18 in substantial parallelism with the line connecting the axes of the centers 20—21. A lug 34 is provided with a rectangular aperture 35, whereby it is slidably mounted upon the bar 32. A set screw 36 passed through this lug and having a bearing upon the bar provides means for locking the lug in any desired position upon the bar. A reamer lock block 37, longitudinally slotted at one end as shown at 38, is adjustably mounted upon the lug 34 by means of a set screw 39 passed down through the slot 38 into threaded engagement with the lug 34. Thus the block 37 may be adjusted laterally as desired and locked in place by the screw 39. The outer end of the block 37 is provided with an aperture 40 and the extremity of the block is then split from the aperture out through the end, as shown at 41. A thumb or set screw 42, passed loosely through one side 43 of the split end and into threaded engagement with the other side 44, thus adjustably engages a reamer lock post 45 seated vertically in the aperture 40. Thus the post 45 may be raised or lowered as desired, and also may be rotated or turned laterally, and then locked in any set position.

An aperture 46 is pierced horizontally through the upper end of the post 45 and a threaded adjustment pin 47 is passed loosely through this aperture. Nuts 48, threadedly seated upon the pin 47 at each side of the post 45, provide means for locking the pin 47 at any desired position of adjustment. A leaf spring 49 is fastened at its outer end to the inner end of the pin 47, as shown at 50, the inner end 51 of the spring being adapted to be placed in engagement with a flute of a reamer 30 as mounted in place between the centers 20—21, thus preventing the rotation of the reamer save in one direction. A hone carrier 52 is provided, the same being substantially in the form of a fork including a handle 53 and spaced, flat prongs 54. The hone 55 is mounted between these prongs and is locked in place by means of bolts 56 passed through the prongs. This hone carrier is long enough to substantially span the bearing rods 17, and so as to permit of the reciprocation of the carrier in a fixed plane while resting upon the said rods, so that the blades may be sharpened on any fixed angle desired across their cutting edges.

In the use of the tool as so far described, the straight bladed reamer 30 is properly positioned between the centers 20—21 as already pointed out, and the end 51 of the spring 49 is placed in lateral engagement with the uppermost blade of the reamer as shown in the drawing. For this purpose the elements 34, 37, 45 and 47 may be manipulated as required, and the yoke 18 may also be rocked as may be necessary, for the purpose of sharpening tapered or conical reamers. The reamer is properly positioned for the abrasive action of the hone by adjusting the yoke 18 through the bolt 19. With the ends of the hone carrier resting upon the rods 17, the hone 55 is drawn back and forth over the cutting edge of the uppermost blade of the reamer 30, thus sharpening same, after which the other blades are turned up in succession and similarly treated. In this process the operator imparts a torque to the reamer with his free hand, so as to maintain the blade in constant contact with the spring 49. It will be noted in this process that the blades are all sharpened upon co-equal radii as extended from the axis of the reamer, thereby enabling the reamer when used to perform its work perfectly.

For sharpening reamers having spiral blades such as that shown at 31 in Figure 10, the post 45 is removed, and a special accessory is provided, same including a bridge bar 57 adapted angularly to span the rods 17, the ends of the bar being anchored to sleeves 58 slidably engaging the said bars. These sleeves are slotted angularly across their upper sides as shown at 59 to provide guide slots to slidably engage the handle 53 and one of the prongs 54 of the hone carrier 52. A base lug 60 is depended from the under side of the bar 57, being secured there by means of a set screw 61 passed through the bar 57 and threadedly engaging the lug. An adjustment lug 62 is mounted upon one side of the lug 60 to which it is pivotally attached by means of a set screw 63 passed through the lug 60 into threaded engagement with the lug 62. Thus the lug 62 may be moved or rotated in a vertical plane relative to the lug 60, and locked in any position. A bore 64 is formed through the lug 62 adapted loosely to engage the adjustment pin 47, which in the sharpening of a spiral reamer as now being considered, is removed from the post 45 and mounted in similar manner through the bore of the lug 62, the nuts 48 being turned up after the pin is properly adjusted longitudinally, with the leaf spring 49 positioned laterally to the uppermost one of the spiral blades of the reamer 31, after the manner as above described relative to the straight bladed reamer. By this arrangement, as the bar 57 is reciprocated back and forth upon the bars 17, the end of the spring 49 bears against the side of the spiral blade and serves as a guide for maintaining the cutting edge of that blade constantly in an uppermost position for sharpening by the hone 55 which is carried along and simultaneously moves over the edge of the blade for sharpening same. At the same time the operator may slide the carrier 52 transversely of the reamer as may be desired, the handle and one prong sliding through the slots 59, as above pointed out. The operator may maintain the blade in constant contact with the spring 49 by imparting the proper reverse rotative torque to the reamer with his free hand, as heretofore pointed out with reference to the straight bladed reamer.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a tool of the kind described, a base, a post seated in the base, a hone holder bearing yoke slidably mounted upon the lower part of the post, means for vertically adjusting and setting the yoke upon said post, a hone carrier bearing frame horizontally mounted at the upper part of the said yoke, a reamer holder yoke pivotally mounted at the upper end of the said post and adapted to rock in a plane parallel with the plane including the axes of the arms of the hone holder bearing yoke, means for adjustably locking the last named yoke in any adjusted position, centers adjustably journaled in horizontal axial alignment through the upper ends of the arms of the reamer holder yoke and adapted to support a reamer thereinbetween, adjustable means for maintaining the blade of the reamer in upturned position for sharpening, a hone holder adapted to slidably span the bearing frame at the upper part of the hone holder bearing yoke, and a hone seated in the said hone carrier and adapted to bear upon the edge of the upturned blade of the reamer as supported by the said centers.

2. In a tool of the kind described, a hone holder bearing yoke and a reamer holder yoke adjustably supported in cooperative association, a pair of hone holder bearing rods supported in spaced and parallel relation upon the said hone holder bearing yoke, a pair of centers adjustably journaled in axial alignment at the ends of the reamer holder yoke, the said centers being adapted to axially support a reamer positioned thereinbetween, releasable means for maintaining the blades of the reamer in position for sharpening with its extended plane substantially perpendicular to a plane including the axes of the said pair of hone holder bearing rods, and a hone carrier and hone therein, the said carried being adapted to span the said bearing rods.

3. In a tool of the kind described, a base, a pair of hone carrier supporting rods horizontally supported from the base in spaced parallel relation, a reamer holder yoke adjustably mounted in cooperative association with the pair of hone carrier supporting rods, the plane including the axes of the arms of the yoke being disposed substantially perpendicular to the plane including the axes of the said rods, adjustable means at the ends of the arms of the reamer holder yoke for rotatably supporting a reamer, adjustable means for releasably locking the reamer against rotation in one direction, a hone carrier adapted to span and slidably engage the pair of hone carrier supporting rods, and a hone mounted in the said carrier and adapted to bear upon the reamer blades as same are turned towards the hone.

4. In a tool of the kind described, a reamer holder yoke mounted to rock in a plane coincident with the axes of the yoke arms, adjustable means at the ends of the yoke arms for axially supporting a reamer to rotate upon its axis, a hone carrier supporting frame having members spanning laterally the arms of the said reamer holder yoke, the said frame being supported with the plane of its members substantially perpendicular to the plane of the arms of the said yoke and adjustable perpendicularly to that plane, and a hone carrier for slidable positioning across the said frame.

5. In a tool of the kind described, a reamer holder yoke mounted to rock in a plane coincident with the axes of the yoke arms, adjustable means at the ends of the yoke arms for axially supporting a reamer to rotate upon its axis, a hone carrier supporting frame having members spanning laterally the arms of the said reamer holder yoke, the said frame being supported with the plane of its members substantially perpendicular to the plane of the arms of the said yoke and adjustable perpendicularly to that plane, a hone carrier for slidable positioning across the said frame, and means for releasably locking a reamer mounted as stated against rotation in one direction.

6. In a tool of the kind described, a reamer holder yoke mounted to rock in a plane coincident with the axes of the yoke arms, adjustable means at the ends of the yoke arms for supporting a reamer for rotation upon its axis, a hone carrier supporting frame having parallel side members spanning laterally the said reamer holder yoke, the said frame being supported with the plane of its members substantially perpendicular to the plane of the arms of the reamer holder yoke and adjustable perpendicularly to that yoke, a bridge bar spanning and slidably engaging at its ends the parallel side members of the hone carrier supporting frame, a hone carrier associated with the bridge bar to travel therewith upon the hone carrier supporting frame and to slide in a path parallel thereto, and adjustable means depending from the bridge bar for steadying the reamer.

7. In a tool of the kind described, a post vertically arranged, a hone holder bearing yoke vertically arranged upon the post, a reamer holder yoke adjustably supported upon the post in a vertical position and in co-operative association with the hone holder bearing yoke, a rectangular hone holder bearing frame mounted on the hone holder bearing yoke and arranged angularly to said vertical post, a pair of centers adjustably journaled in axial alignment at the ends of the reamer holder yoke, the said centers being adapted to axially support a reamer positioned thereinbetween, releasable means for maintaining the blades of the reamer in position for sharpening with its extended plane substantially perpendicular to a plane including the axes of the said pair of hone holder bearing rods, and a hone carrier and hone therein, the said carrier being adapted to span the said bearing rods.

8. In a tool of the kind described, a hone carrier rest including spaced and parallel rods, means for rotatively supporting a reamer between the rods, a bridge bar adapted to span the rods, sleeves attached to the ends of the bridge bar and slidably mounted on the said rods, a leaf spring adjustably mounted on the bridge bar and adapted to engage the flutes of a reamer supported between the said rods, the said sleeves having guide slots cut in their upper sides at an angle to the axes of the rods, and a hone carrier slidably mounted in the said guide slots.

In testimony whereof, I affix my signature.

WILLIAM WALTAMATH.